Sept. 8, 1942.   R. M. SHAW, JR   2,295,299
POWER TRANSMISSION
Filed Jan. 6, 1942
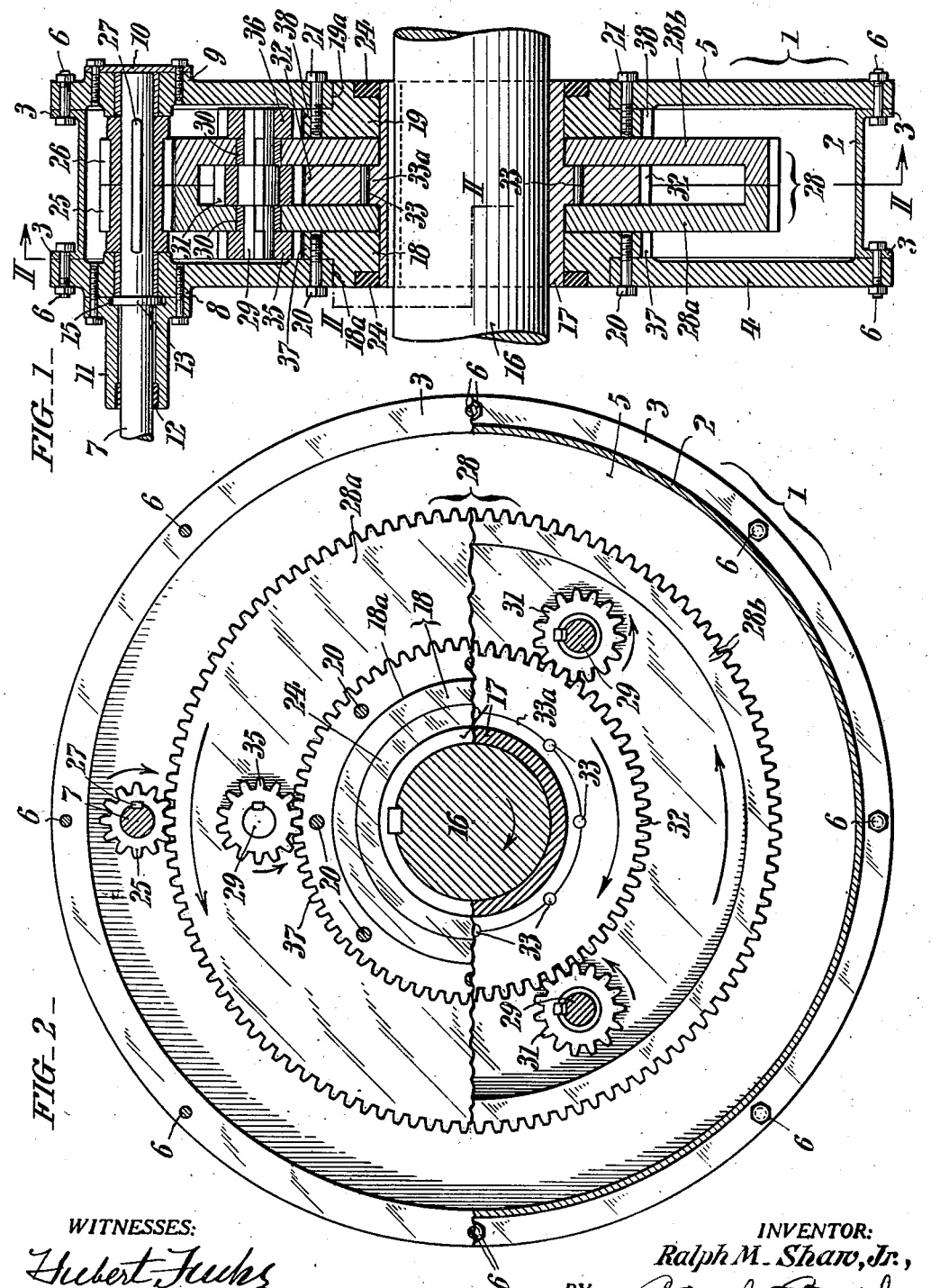
WITNESSES:
INVENTOR:
Ralph M. Shaw, Jr.,
BY
ATTORNEYS.

Patented Sept. 8, 1942

2,295,299

UNITED STATES PATENT OFFICE 2,295,299

POWER TRANSMISSION

Ralph M. Shaw, Jr., Edgewater Park, N. J.

Application January 6, 1942, Serial No. 425,723

7 Claims. (Cl. 74—806)

This invention relates to transmissions; that is to say, to devices for transmitting power to a machine or apparatus at changed speed from a prime mover such as an electric motor. More specifically, the invention has to do with transmissions in which the motion transfer is effected by planetary gearing.

In connection with transmissions of the kind referred to it is my aim to secure a more uniform distribution of the load strains than possible of attainment with transmissions as ordinarily constructed, with a view toward precluding or minimizing torsion in the shafting and gearing, thereby to assure more effective transmission of power and quieter operation with reduced wear, particularly in instances where frequent reversal is necessary or required in driving different types of machines or apparatus.

One way in which the foregoing and other important objects and advantages may be readily realized in practice will appear from the detailed description which follows of the attached drawing, wherein Fig. 1 is a longitudinal sectional view of a power transmission conveniently embodying the present improvements; and Fig. 2 is a view of the transmission partly in elevation as seen from the left in Fig. 1 and partly in section taken as indicated by the angled arrows in Fig. 1.

As herein shown, the moving parts of my improved transmission are enclosed in a housing 1 consisting of a main or body component 2 which is in the form of a relatively narrow annulus and provided at its opposite ends with outstanding circumferential flanges 3, and two counterpart circular dish-like side wall components 4 and 5 which respectively close the ends of said body component. The side components 4 and 5 of the housing may be secured in any convenient manner, as for example, by an annularly arranged series of screw bolts 6 the shanks of which pass through registering holes respectively in said side wall components and in the flanges 3 of the body component 2. The in-put or drive shaft 7 of the transmission extends into the housing 1 from one side near its periphery, and is journalled in bushed bearing bosses 8 and 9 on the side wall components 4 and 5, the outer end of the shaft opening in the boss 9 being sealed by a removable cover plate 10. The protruding end of the in-put shaft 7 is afforded additional support in a supplemental bearing 11 which is bolted fast to the outer face of the boss 8, and which is bushed at its outer end as at 12, said shaft being otherwise free of circumferential contact with the bore of said supplemental bearing. Endwise thrust of the shaft 7 is resisted by an integrally-formed circumferential ridge or flange 13 for the accommodation of which the inner face of the supplemental bearing 11 is recessed as at 15. As shown, the shaft 7 extends outward beyond the supplemental bearing 11 so that a pulley or any other suitable power driving means may be mounted upon it.

The out-put shaft of the transmission is indicated at 16, and, as shown, passes axially through the housing 1, and, within the confines of the latter, has keyed to it a sleeve 17. At its opposite ends the sleeve 17 is journaled in annular bearing members 18 and 19 which abut the inner faces of the side wall components of the housing 1 whereto they are secured by cap screws 20 and 21, and which have diametrically reduced portions 18a, 19a which engage outwardly into the central openings of said wall components with a snug fit. At 22 and 23 the members 18 and 19 are recessed for retainment of oil seals 24.

The gearing of the transmission includes a pair of similar toothed pinions 25 and 26 which are mounted in opposed relation side by side on the drive shaft 7 within the housing and keyed to said shaft at 27, and which mesh with a toothed wheel 28 free to revolve about the sleeve on the shaft 16. If desired or found more convenient in practice, the pinions 25, 26 may be made as one. From Fig. 2 it will be noted that the gear wheel 28 is hollow and formed in two sections or halves 28a, 28b of dished cross sectional configuration which abut in the central plane of said housing, and carries a plurality of spindles 29 which are equi-spaced circumferentially in a circle concentric with the axis of the out-put shaft 16. As instanced in Fig. 1, each of the spindles 29 passes through bearing bushings 30 set into the two sections 28a, 28b of the gear wheel 28. Keyed to each of the spindles 29 within a central hollow of the gear wheel 28 is a spur pinion 31 which meshes with a small gear wheel 32 also within the hollow of said wheel 28 and secured by dowels 33 to a central circumferential flange 33a on the sleeve 17. To the outer ends of each spindle 29 are secured pinions 35 and 36 which respectively mesh with gear teeth 37 and 38 on the fixed bearing members 18 and 19 for the out-put shaft 16, said members thus serving as fixed sun gears.

In practice, the housing 1 is kept partly filled with oil so that the moving elements of the transmission are constantly lubricated automatically by contact and splash action.

In the operation of the transmission, the pinions 25, 26 on the in-put shaft 16 drive the gear wheel 28 which revolves freely about the sleeve 17 on the out-put shaft 16 as hereinbefore stated. As the gear wheel 28 rotates, the planetary pinions 35, 36 on the outer ends of the spindles 29 roll around the stationary sun wheels formed by the toothed portions 37, 38 of the bearing elements 18 and 19. The rotative motion incidently induced in the spindles 29 is communicated by the pinions 31 to the gear wheel 32 affixed to the sleeve 17 which is keyed to the out-put shaft 16. It is to be noted that the pinions 35 and 36 are slightly smaller than the pinions 31, and that the gear wheels 37 and 38 are slightly larger than the gear wheel 32 so that a differential exists between these gear sets. Due to the described arrangement of the gear elements and the great difference in the ratios between the pinions and the gear wheels employed, it will be apparent that the speed of the out-put shaft 16 will be exceedingly small as compared to that of the in-put shaft 7, the reduction being effected in two stages, the first between the pinions 25, 26 and the gear wheel 28, and the second between the pinions 31 and the gear wheel 32. The amount of total reduction can of course be varied by changing the relative diameters of the several gears and pinions, if desired. While for convenience, I have described the transmission as a speed reducer, it can obviously be employed as a speed multiplier in which case the shaft 16 will be made to serve as the in-put shaft and the shaft 7 as the out-put shaft. In either event, due to the provision of the duplicate planetary gear groups at opposite sides of the gear 32 through which the power is transmitted to or from the shaft 16, it will be seen that the load strains are uniformly distributed in the device with effective preclusion or minimization of torsion or twisting in the shafting. For this reason it will be seen that my improved transmission is capable of transmitting great power quietly and efficiently, and that it can be relief upon for long service without becoming deranged or requiring any attention other than for replenishment of the lubricant at very protracted intervals. From the foregoing, it will moreover be apparent that I have provided a transmission unit whereof the housing is so constructed as to allow ready access to its interior for convenience of substituting gear elements of other ratios when desired.

Having thus described my invention, I claim:

1. A power transmission including a pair of shafts disposed in eccentric relation to each other; a spur gear pinion fixed on one of the shafts and meshing with a spur gear wheel free to revolve about the other shaft; a spindle journalled in the spur gear in parallel eccentric relation to the second mentioned shaft; duplicate planetary pinions affixed respectively to opposite ends of the spindle and meshing with fixed sun gears at opposite sides of the revolving gear wheel in concentric relation thereto; and a third pinion affixed medially of the spindle within a central hollow of said first mentioned gear wheel and meshing with a spur gear wheel affixed to said second mentioned shaft.

2. A power transmission according to claim 1, having duplicate spindles with outer and medial pinions disposed at intervals around the first mentioned gear wheel in mesh respectively with the fixed sun gear wheels and the gear wheel affixed to the second mentioned shaft.

3. A power transmission according to claim 1, in which the several gears and pinions are enclosed in a fluid-tight housing containing a supply of oil for the purposes of self-lubrication by contact and splash action.

4. A power transmission according to claim 1, in which the first mentioned gear wheel is formed by two opposingly-arranged, dished halves which meet in the central plane of the wheel and jointly provide the hollow for the accommodation of the medial pinion on the spindle and the gear wheel in mesh therewith.

5. A power transmission according to claim 1, having duplicate spindles with outer and medial pinions disposed at intervals around the first mentioned gear wheel in mesh respectively with the sun gear wheels and the gear wheel affixed to the second mentioned shaft; and in which the first mentioned gear wheel is formed by two opposingly-arranged dished halves which meet in the central plane of the wheel and jointly provide the hollow for the accommodation of the medial pinions on the spindles and the gear wheel in mesh therewith.

6. A power transmission according to claim 1, in which the several gears and pinions are enclosed in a fluid-tight housing containing a supply of oil for the purposes of self-lubrication by contact and splash action, and having an annular main component and opposite end walls; wherein the sun gear wheels contact opposite sides of the first mentioned gear wheel and about the inner faces of the housing side walls; and wherein said sun gear wheels provide bearings for the second mentioned shaft.

7. A power transmission including an in-put shaft and an out-put shaft eccentrically disposed relative to each other; a spur pinion affixed to the in-put shaft and meshing with a spur gear wheel which is free to revolve about the out-put shaft; a spindle journalled in the gear wheel in parallel eccentric relation to the axis of the out-put shaft; duplicate planetary pinions affixed respectively to opposite ends of the spindle and in mesh with fixed sun gears disposed at opposite sides of the first mentioned gear wheel in concentric relation therewith; and a third pinion medially of the spindle within a central hollow of the first mentioned gear wheel for driving an intermeshing spur wheel affixed to the out-put shaft.

RALPH M. SHAW, Jr.